(12) United States Patent
Brody et al.

(10) Patent No.: US 6,278,697 B1
(45) Date of Patent: Aug. 21, 2001

(54) METHOD AND APPARATUS FOR PROCESSING MULTI-PROTOCOL COMMUNICATIONS

(75) Inventors: George Brody; Zye K. Cheng, both of Richardson, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/902,056

(22) Filed: Jul. 29, 1997

(51) Int. Cl.[7] .................................................. H04B 7/00
(52) U.S. Cl. ............................................ 370/310; 370/466
(58) Field of Search ................................... 370/466, 467, 370/469, 401, 398, 310, 316, 319–321, 337, 342, 344, 347, 431, 442, 441, 465

(56) References Cited

U.S. PATENT DOCUMENTS

| | | | |
|---|---|---|---|
| 5,619,504 | * 4/1997 | Van Grinsven et al. | 370/347 |
| 5,809,028 | * 9/1998 | Nethercott et al. | 370/467 |
| 5,872,919 | * 2/1999 | Wakeland | 709/230 |
| 5,872,926 | * 2/1999 | Levac et al. | 709/206 |
| 5,894,478 | * 4/1999 | Barzegar et al. | 370/401 |
| 5,896,383 | * 4/1999 | Wakeland | 370/400 |
| 5,905,873 | * 5/1999 | Hartmann et al. | 370/389 |

\* cited by examiner

*Primary Examiner*—Ajit Patel
(74) *Attorney, Agent, or Firm*—John D. Crane

(57) ABSTRACT

A method and apparatus for processing multi-protocol communications via a single system is accomplished by receiving a message from a first communications device wherein the message includes the identity of at least a first communications device and a second communications device. When the first communications device utilizes a different communications protocol than the second communication device, the messages transceived between the two communication devices are converted by an appropriate communication protocol. Such conversion is done by first converting an incoming message having a first communication protocol format into a message having a generic communication protocol format. The message having the generic communication protocol format is then converted into a message having a second communication protocol format, which message is subsequently routed to the second communication device.

28 Claims, 8 Drawing Sheets

METHOD AND APPARATUS FOR PROCESSING MULTI-PROTOCOL COMMUNICATIONS

TECHNICAL FIELD OF THE INVENTION

This invention relates generally to telecommunications and more particularly to a method and apparatus for processing multiple over-the-air communication protocols via a single communications system.

BACKGROUND OF THE INVENTION

The telecommunication industry has undergone dramatic evolutionary changes over the past twenty years. In short, it has gone from a system that primarily provided simple party-to-party voice communication using rotary dial telephones over wireline connections to a complex inter-network system that provides a plethora of communications over wireline/optical/wireless/satellite connections. For example, today, the subject medium of a communication may be voice, data, video, multi-media or facsimile and such communication may be received/transmitted by digital telephones, analog telephones, cellular telephones, computers, facsimile machines, etc.

This evolution has been so dramatic that it has spawned a plurality of new technologies and caused evolutionary changes within these new technologies. For example, cellular communications has undergone dramatic evolutionary changes since its initial conception in 1947 by AT&T. The first major evolutionary change occurred in the 1970's when the technology was developed to make call-hand off commercially viable. Call hand-off is the capability of maintaining communications between a cellular phone and another telephone as the cellular phone moves from an area served by a first base station to an area served by a second base station.

Advanced Mobile Phone Service (AMPS) became a commercial success for sophisticated consumers as a result of the call hand-off technology. As the demand for cellular service grew, new systems, having new over-the-air protocols and increased capacity, were created. For example, Time Division Multiple Access (TDMA) and Global System for Mobile Communications (GSM) were developed and commercialized in the 1980's and early 1990's. Now, with the ever increasing processing power of integrated circuits, digital communication systems are being developed, such as Code Division Multiple Access (CDMA), Digital AMPS, and Personal Communications Service (PCS).

In addition to the dramatic technical changes, the number of services and the ease of use of the services has dramatically changed as well. For example, a wireless telephone user may receive facsimile transmissions, use call forwarding, use caller identification, and a plurality of other features. And each of these features can be done more conveniently than in the past.

As can be understood from this brief discussion, the wireless communications industry has dramatically changed and evolved. One drawback to the dramatic wireless telecommunication advances is that the different systems are not compatible with each other. For example, an operator of an AMPS wireless telephone cannot access a TDMA, CDMA or any system other than an AMPS system. The operator of the AMPS phone, however, may communicate with an operator of a TDMA phone, but the communication must be routed through the Public Switched Telephone Network (PSTN) for protocol conversion.

In general, to allow a wireless user of one type of over the air interface (i.e., first communication protocol) to communicate with another wireless user of a different over the air interface (i.e., second communication protocol), the communication must be routed to PSTN. The PSTN then does a protocol conversion from one over the air interface to the other. This is done by converting the incoming call, which has a first over-the-air protocol, to the voice domain. Then the PSTN converts the voice domain information into the over-the-air protocol of the receiving communication device. This conversion process continues as long as the two communication devices are engaged in a communication.

This scenario occurs even when both users are in the same geographic area. For example, assume a remote geographic location is linked to the PSTN via satellite and the remote location offers fixed wireless access, wireline services, and wireless services such as TDMA, CDMA, GSM, etc. For a communication between a fixed wireless device and any other communication device, the communication must be routed to the PSTN via the satellite link for conversion. The same is true for wireless devices that use different over the air interfaces. Thus, even though the communicating parties are in relatively close physical proximity, the communication must be routed a significant distance to support the inter-protocol communication. As one would expect, this adds to communication traffic and reduces the efficiency of the overall telecommunications network.

Therefore, a need exists for a method and apparatus that allows for conversion of telecommunication protocols in a manner that permits communication between devices that utilize different protocols and reduces communication overhead over the PSTN.

DETAILED DESCRIPTION OF THE PREFERRED EMBODIMENT

Generally, the present invention provides a method and apparatus for processing multi-protocol communications via a single communication system. (Note that the single communication system is a logical system and may be distributed throughout a communications network or physically located in a single switch or box.) This is accomplished by receiving a message from a first communications device wherein the message includes the identity of the first communications device and the identity of a second communications device. The first and second communication devices may have protocols different from each other and selected from over via interfaces such as CDMA, TDMA, GSM etc. protocols. Alternatively, the protocols may be the same over the air interfaces but utilizing a different voice coding rate.

Having received the identity of the first and second communications device, a first communications protocol server is identified based on the protocol used by the first communications device. The first communications protocol server then converts the received message having a first communication protocol format into a generic protocol message. A second communications protocol server is subsequently identified based on the second communications protocol and receives the generic protocol message from the first communications protocol server. Having received the generic protocol message, the second communications protocol server converts the generic protocol message into a second message having a format based on the second communications protocol.

The converted second communications protocol message is subsequently sent to the second communications device thereby establishing, or setting up a communication between the first communications device and the second communications device. With such a method and apparatus, the present invention allows for a single logical system to process multi-protocol communications without routing the information to the PSTN thereby improving the overall efficiency of a telecommunications infrastructure.

Figure 1:
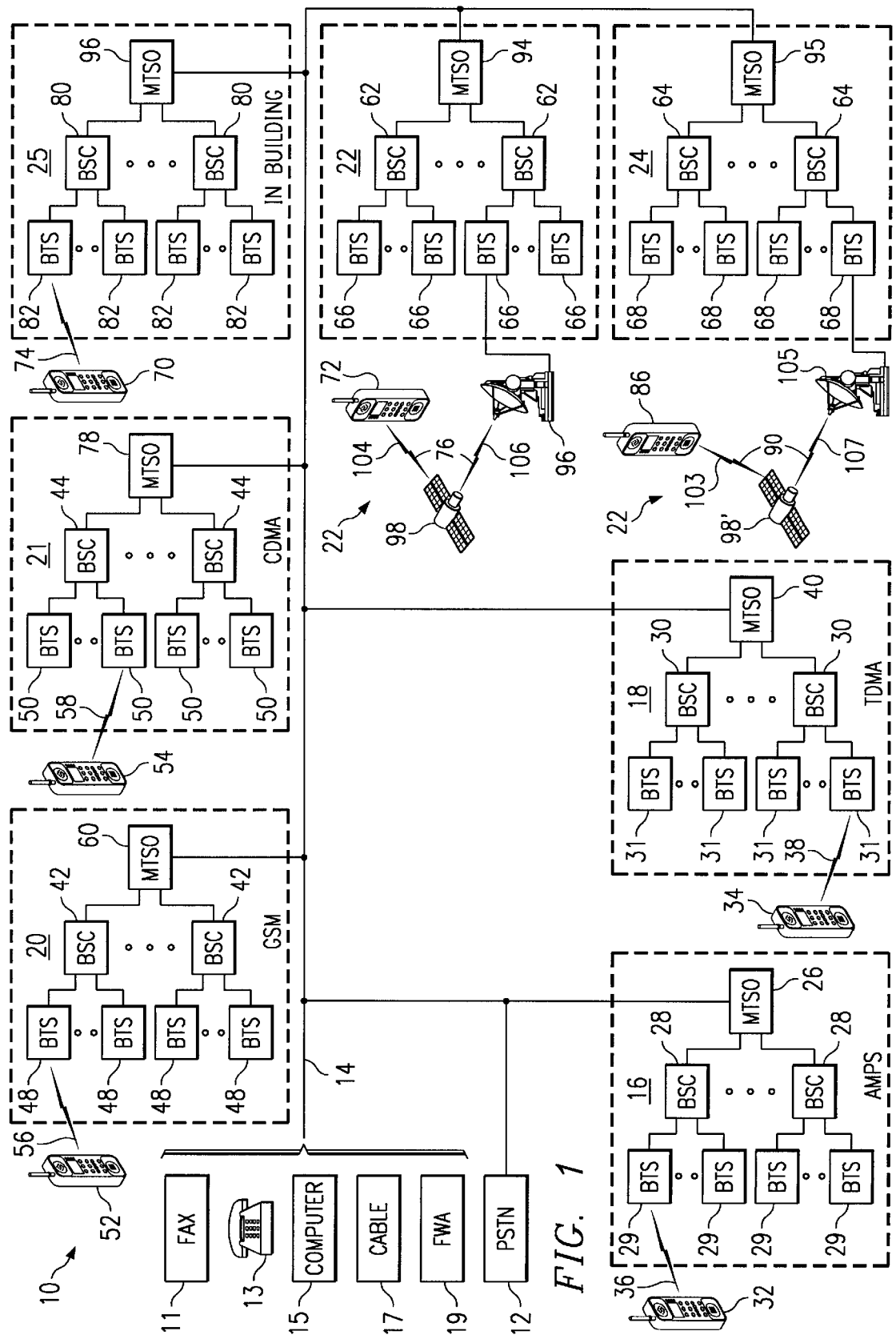
FIG. 1 illustrates a telecommunication environment that supports a plurality of telecommunication systems.

The present invention is described more fully below while making reference to FIGS. 1 through 19. FIG. 1 illustrates a telecommunications environment 10 that includes a public switch telephone network (PSTN) 12 that is operably coupled to wireline devices, via a wireline connection 14, and a plurality of wireless communications systems. Such wireless communications systems include an Advanced Mobile Phone System (AMPS) 16, Time Division Multiple Access (TDMA) system 18, and Global System for Mobile Communications (GSM) 20, Code Division Multiple Access (CDMA) system 21, satellite 22, independent satellite system 24, and inbuilding system 25.

Typical wireline devices include a facsimile machine 11, a digital or analog telephone 13, a computer 15, a cable box 17, or fixed wireless access device 19. Each one of these devices is well known in the art thus no further discussion will be presented except to further illustrate the applications of the present invention.

Each of the wireless communications systems 16, 18, 20, 21, 22, 24, 25 includes a mobile telephone switching office (MTSO) 26, 40, 60, 78, 94, 95 and 96, a plurality of base station controllers (BSC) 28, 30, 42, 44, 62, 64, 80, and a plurality of base transceivers station (BTS) 29, 31, 48, 50, 66, 68, 82. The wireless communication systems each further includes a plurality of communication devices 32, 34, 52, 54, 70, 72, 86. Such communication devices may be mobile cellular telephones, portable cellular telephones, personal digital assistants (PDA), computers with a wireless modem, or any other type of device that transceives information over a wireless communication path using a predefined over-the-air protocol.

For the AMPS 16, TDMA 18, GSM 20, and CDMA 21 systems, communication to/from a communication device is first established by communicating call set-up information over a control channel. In general, if a communication device desires to initiate a wireless communication, the communication device transmits a communication initiation message over a wireless communication path such as path 36, 38, 56, 58, 74, 76, or 90 to a base transceiver station. The communication initiation message includes at least the identity of the communication device and the desired service. For example, if the desired service is a telephone call, the communication initiation message will include the identity of the called party.

Upon receiving the communication initiation message, the base transceiver station routes the message to the base station controller which, in turn, routes the message to the mobile telephone switching office (MTSO). The MTSO interprets the message to determine whether the initiating communication device is a valid user and the desired service has been subscribed to by the communication device. If the preceding inquires are answered in the positive, the MTSO determines whether the desired service can be handled locally or whether it needs to be routed to the network.

The MTSO can process the desired service locally if the desired service is a simple inquiry of the system—for example, a list of alternate control channels of adjacent sites. For a desired service that involves a party to party communication, the MTSO can only process the request locally if both parties are within the coverage area supported by the MTSO and if both parties are using the same communication protocol. As previously mentioned, communication protocols are the same if they employ the same over-the-air interface protocol and use the same voice encoding rate. Thus, if a first communication protocol is formatted based on AMPS and has an encoding rate of 64 Kbps and the second communication protocol is formatted based on AMPS and has an encoding rate of 16 Kbps, the two protocols are not the same. When the protocols are not the same, the MTSO must route the communicated information to the PSTN for protocol conversion, even if both parties are within overlapping coverage areas. The present invention substantially eliminates such routing to the PSTN for protocol conversions.

For systems that include a satellite link 22, communication devices 72, 86 may request desired services in a similar manner as in other wireless systems. For example, communication device 72, 86 may transmit a communication initiation message to MTSO 94, 95 via satellite 98, 98', ground station 96, 105 and wireless communication paths 104, 106, 103, 107. Upon receiving the message, MTSO 94, 95 verifies the messages and encounters the same problems as previously discussed if the request is for party to party communications and the two parties use different communication protocols.

Wireless communication system 10 includes many systems 16, 18, 20, 21, 22, 24, 25 linked to the PSTN 12 which can be thought of as a local network. As one skilled in the art will readily appreciate the remote local network may include more or fewer systems than shown, may include fixed wireless access, may include PCS, CDMA, etc., and may include systems that use the same over-the-air interface.

In such a local network, when a communication device transmits a communication initiation message, the associated MTSO encounters the same problems as described above for requests that have multiple parties having different communication protocols. In such local networks, however, the problem is magnified because a majority of the communication service requests will be local in nature, i.e., neighbors calling each other, or placing calls to local businesses. Yet, if the parties have communication devices that utilize different communication protocols, the conversion from one protocol to another is done by the PSTN. Thus, all local calls between different communication devices are routed over some communication link to the PSTN, which limits the efficiency of the local network and substantially adds to the cost of such telecommunications.

Figure 2:
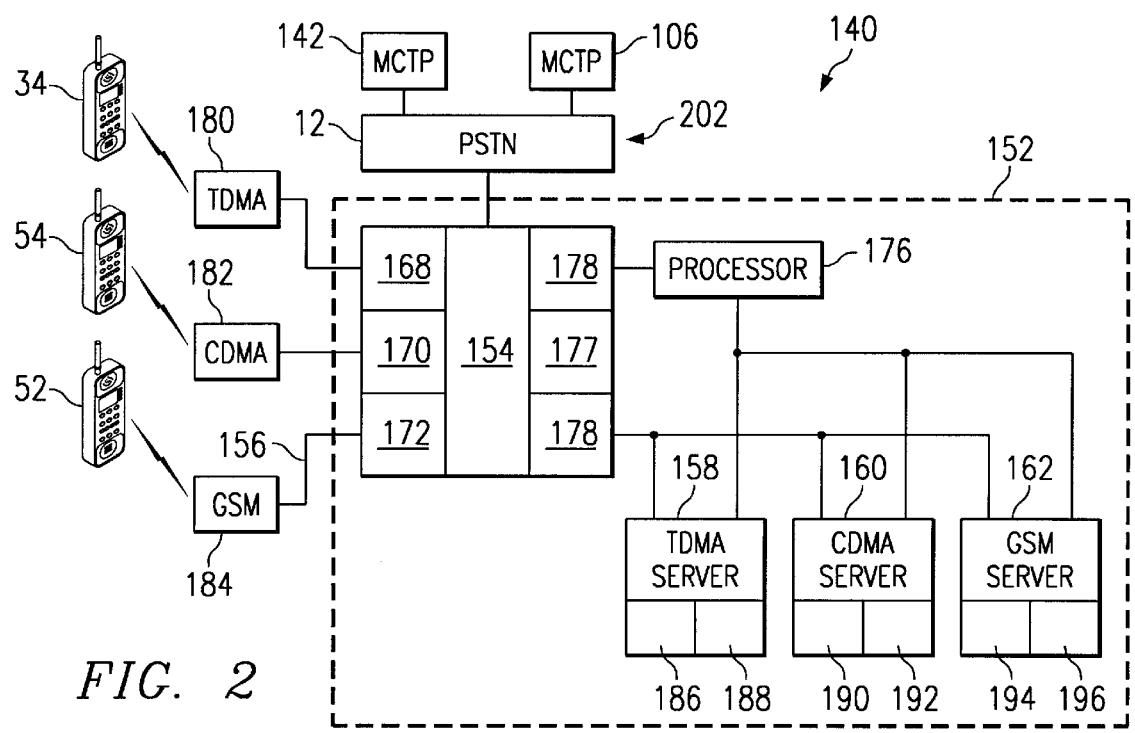
FIG. 2 illustrates a portion of the telecommunication environment of FIG. 1 and further illustrates a multiple communication type processor in accordance with the present invention.

FIG. 2 illustrates a telephone network 140 that includes a PSTN 12 and a plurality of multi-communications Type (MCT) Processors 152, 106, 142. As shown, each of the MCT Processors 152, 106, 142 is coupled to the PSTN either directly through a wireline link or through a satellite link. The multi-communications type processor 152, the MCT processor is shown to include a communications switch 154, and a plurality of communications protocol servers 158, 160, 162.

The communications switch 154 include a plurality of interfaces 168, 170, 172 which couple controlling equipment (BSC and BTS) of the various wireless communications systems to the communication processor 176. (The functionality of the communications processor will be described below with reference to FIGS. 8 through 11.) As shown, the interfaces 168, 170 and 172 are respectively connected to TDMA equipment 180, CDMA equipment 182, or GSM equipment 184. As previously discussed, the BSC and BTS communicate with corresponding communications devices 34, 54, and 52.

The communication switch 154 also includes an interface 178 that couples the communications processor 176 to a plurality of communications protocol servers 158, 160, and 162. Further, the communications switch 154 may include a voice transcoder 177 which performs rate adaptations for the various types of bit rates used for the wireless communications. Note that the voice transcoding is for bit rates of voice communications and that such transcoding is well known in the art thus no further discussion will be presented except to further illustrate the present invention. Further note that, as one skilled in the art will readily appreciate, an incoming facsimile transmission will bypass the voice transcoder 177 with well known techniques.

The plurality of communications protocol servers 158, 160 and 162 each respectively include a protocol converter 186, 190, 194 and a protocol inverter 188, 192, and 196. Discussing the overall operation of communication protocol server 162 as a typical example of the protocol servers, the server 162 receives, via the transport medium 156, an incoming GSM formatted message. The server 162, using its protocol converter 194, converts the GSM formatted message into a generic protocol message. As one skilled in the art will readily appreciate, the GSM formatted message may be a call set-up message, a voice communication, a data communication, or any combination thereof.

Conversion from the GSM formatted message to the generic protocol message is done using data messaging and may be based on a mapping to a particular protocol. For example, a message having a GSM protocol format may be mapped to a particular generic data messaging format, where the mapping utilizes one of the existing protocols (Eg. to a GSM format). Thus, continuing with the example, all over-the-air protocol formatted messages would be mapped to a GSM format. Alternatively, the generic protocol mapping may be done using a newly created generic protocol.

In a converse manner, the protocol inverter 196 receives a message having a generic protocol format from the data transport medium 156 and converts the message into a message having a GSM format. As one skilled in the art will readily appreciate, the messages, whether protocol specific or generic, will include some addressing information such that it is routed to the appropriate server. Such addressing will be discussed in greater detail below.

In the immediately preceding discussion, the server 162 is exemplary of a GSM communication protocol server. The communications protocol server 160 processes TDMA formatted messages and the communications protocol server 158 processes CDMA formatted messages. They both operate in a similar manner to the GSM communication protocol server 162, but for their respective over-the-air protocols. Note that the MCT processor may include more or fewer communication protocol servers. Further note that an MCT processor may include several communication protocol servers that operate on the same over-the-air protocol (Eg. multiple GSM communication protocol servers). Still further note that an MCT processor may include multiple communication protocol servers that process the same over-the-air protocol but at different encoding rates (eg. AMPS, where one server processes AMPS formatted messages having an encoding rate of 64 Kbps and another server processes AMPS formatted messages having an encoding rate of 16 Kbps).

Figure 3:
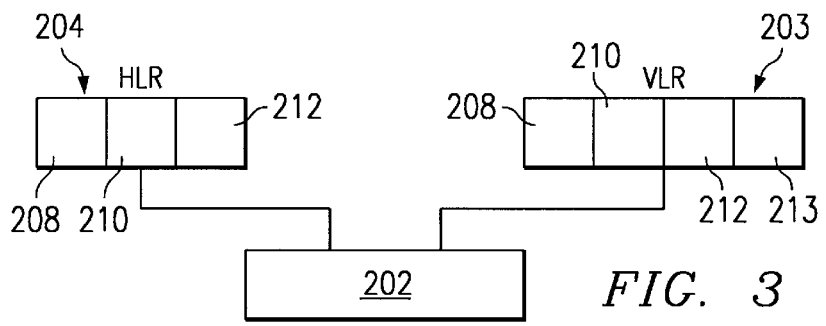
FIG. 3 illustrates an embodiment of the multiple communication type processor of the type illustrated in FIG. 2 but configured as a distributed system.

FIG. 3 is a block diagram of a multiple communication type processor 154 having a distributed implementation. As shown, the elements of the MCT processor 154 of FIG. 2 are independently coupled to the PSTN which comprises a distributed processing network 202. The distributed processing network 202 may be an asynchronous transfer mode system (Eg. ATM infrastructure, frame relay, wide area network, internet, or any other means for conveying data within a wide area of network). As is known in the art, in a distributed processing network, each individual element will require a wide area network address so that information can be properly sent thereto from elsewhere in the network.

As is also shown in FIG. 3, a home location register (HLR) 204 is operably coupled to the distributed processing network 202. The HLR 204 includes a table having a subscriber identification field 208, a home mobile service area field 210, and a profile or services field 212. The data contained within the home location register 204 and the operation of a home location register is well known in the art thus no further discussion will be presented except to further illustrate the present invention.

A visitor location register VLR 203 stores similar information to that stored in the HLR 204 but for subscribers who have roamed in the area from outside of their home area network. The VLR 203 also stores information related to the over-the-air protocols 213 of the subscriber listed. Updating and utilizing the data within the VLR is well known in the art, thus no further discussion will be presented except to further illustrate the present invention.

Figure 4:
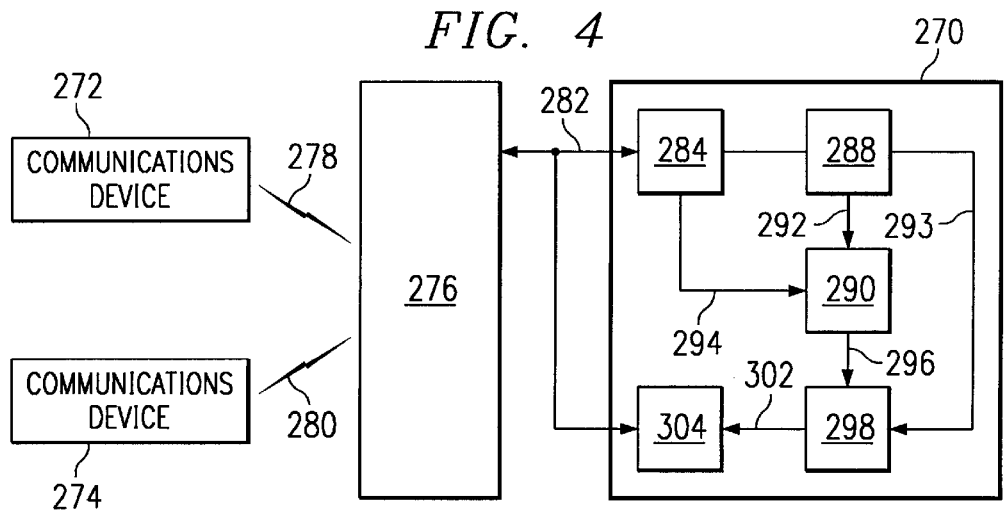
FIG. 4 illustrates an alternate embodiment of a multiple communication type processor, in accordance with the present invention.

FIG. 4 is a schematic block diagram of an alternate embodiment of a multi-communications type processor 270 that converts a first communication protocol message into a second communication protocol message. In such a configuration, the MCT processor 270 would perform a specific protocol conversion. For example, the MCT processor 270 could convert GSM formatted messages into CDMA formatted messages.

As shown, the MCT processor 270 is operably coupled to communications infrastructure 276. The communications infrastructure 276 may include wireless infrastructure, satellite infrastructure, wireline infrastructure, optical infrastructure, or a combination thereof and is coupled to a first communications device 272 via a wireline or wireless link 278 and a second communications device 274 via a wireline or wireless link 280. The first and second communications devices 272, 274 may be any one of the communication devices depicted in FIG. 1.

In operation, the MCT processor 270 of FIG. 4 receives, at receiver 284, communications information via a communication link 282. The received communications information is then routed to a protocol determiner 288 which retrieves identity of the first and second communications devices from the communications information. Based on the identity of the communication devices, the protocol determiner 288, via a table look-up or similar process, identifies the communications protocol for the first and second communications devices 272 and 274. If the protocol determiner 288 determines that the first and second communications devices 272 and 274 are utilizing different communications protocols, the protocol determiner 288 enables, via enable line 292, the protocol converter 290 and, via line 293, the protocol inverter 298 is enabled.

When enabled, the protocol converter 290 receives the first message 294, which is formatted in a first communication protocol, and converts the first message 294 into a generic message 296. As previously mentioned, the generic message may be created by mapping the first message into a generic communications protocol, which may be one of the known protocols or a newly created protocol. The generic message 296 is then routed to the protocol inverter 298 which converts the generic message 296 into a second message 302 which is formatted based on the second communications protocol as determined by the protocol determiner 288. The second message 302 is then routed to a transmitter 304 for subsequent routing to the second communications device 274 via the communications infrastructure 276.

Figure 5:
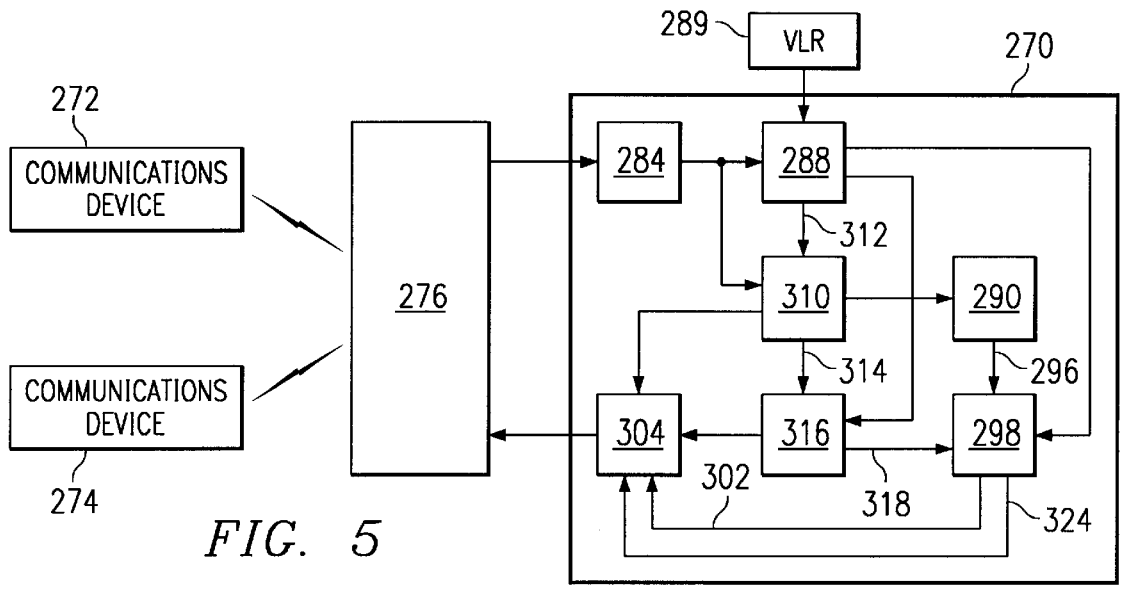
FIG. 5 illustrates another alternate embodiment of the multiple communication type processor in accordance with the present invention.

FIG. 5 illustrates another alternate embodiment of the MCT processor 270. In this embodiment, the MCT processor 270 is dedicated to: converting a message having a first communication protocol format into a message having a second communication protocol format; converting a message having a second communication protocol format into a message having a first communication protocol format; and passing a received message directly to the transmitter 304 when no conversion is needed.

As shown, the MCT processor 270 is coupled to communications infrastructure 276 which is, in turn, coupled to a first and second communications devices 272, 274. The MCT processor 270 includes the receiver 284, which receives incoming communications information, and routes the information to the protocol determiner 288 and a multiplexer 310. The protocol determiner 288 is coupled to a VLR 289, which stores information regarding the communication protocols of the first and second communication devices. By accessing the information in the VLR 289, the protocol determiner 288 determines whether the first and second communications devices utilize the same communications protocol. If they do, the protocol determiner 288, via the control line 312, instructs the multiplexer 310 to pass the incoming communication information directly to transmitter 304.

If, however, the protocol determiner 288 determines that the first and second communications devices are utilizing a different communications protocol, the protocol determiner 288 further determines whether the incoming communication information is from the first communications device or the second communications device. If the incoming message is from the first communications device, the protocol determiner 288 controls the multiplexer via line 312 to route the incoming message to the first protocol converter 290. In addition, the protocol determiner enables the first protocol converter 290 to convert the first message, which has a format of the first communications protocol, into a generic message 296. Having done this, the first protocol inventor 298 converts the generic message 296 into a second message 302, which is formatted based on a second communications protocol. The second message 302 is then routed to the transmitter 304 and subsequently routed to the second communications device.

If, however, the incoming communications information is from the second communications device, the protocol determiner 288 enables the second protocol converter 316 and the multiplexer 310 to route the incoming information to the second protocol converter 316. The second protocol converter 316 converts the second message 314 into a generic message 318 which is subsequently converted by the second protocol converter 320 into a fourth message 324 having a format based on the first communications protocol. As mentioned above, the first and second communications protocol may differ in that they are for different wireless over-the-air interfaces such as CDMA, TDMA etc. or they may be of the same over-the-air interface utilizing different bit rates.

Figure 6:
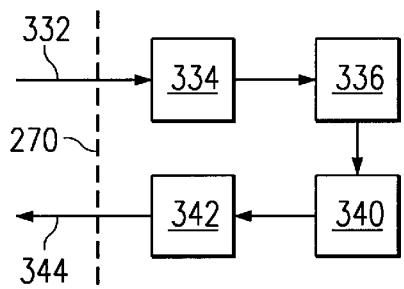
FIG. 6 illustrates yet another alternative embodiment of the multiple communication type processor in accordance with the present invention.

FIG. 6 generally represents the function of the MCT processor 270. In this representation, the receiver 334 receives a first message 332 having a format based on a first communication protocol. The received message is then routed to the protocol converter 336 which converts the received message into a message having a format based on a generic communication protocol. The generic message is subsequently processed by the protocol inverter 340 which converts the message having a format based on the generic communications protocol into a message having a format based on a second communications protocol. The message having the format based on the second communications protocol is routed to the transmitter 342 which is transmitted as the second message 344.

By utilizing an MCT processor of any of the preceding figures, messages having different communication protocols can be processed locally. With the local processing, communication traffic to/from the PSTN is reduced, thus increasing the efficiency of the PSTN.

Figure 7:
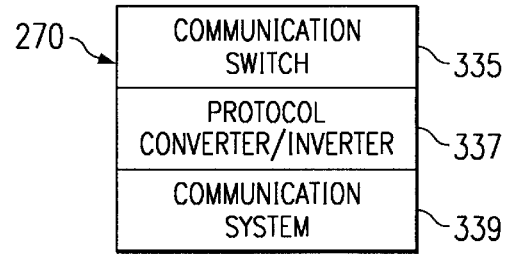
FIG. 7 is a hierarchical representation of a multiple communication type processor in accordance with the present invention.

FIG. 7 is a hierarchical representation of the MCT processor 270. As shown, the representation includes three levels of functionality. The first level is the communication switch 335. As discussed above, this level provides the switching between the different types of communication systems and the protocol servers. The second level is the protocol converter/inverter 337. This level's functionality is to provide the protocol conversion between the different communication systems of the communication system level 339.

Figure 8:
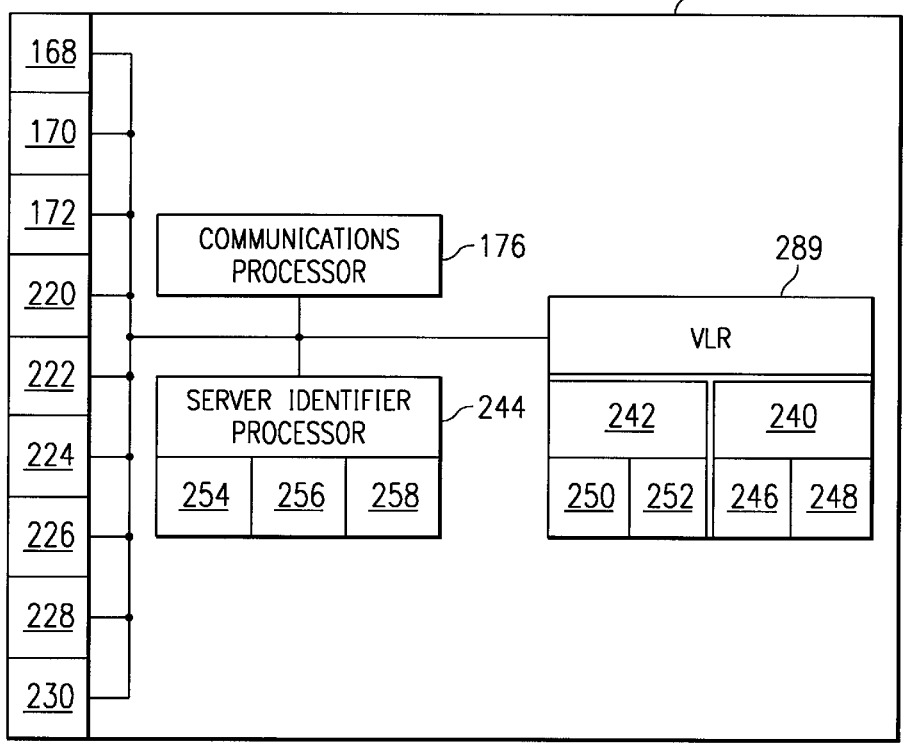
FIG. 8 illustrates an embodiment of a communication switch for handling multiple communication protocols in accordance with the present invention.

FIG. 8 illustrates the communications switch 154. As shown, the switch 154 includes a plurality of interfaces 168, 170, 172, 220, 222, 224, 226, 228, 230 which provide the interface between the different communication systems and the MCT processor. Note that more or fewer interfaces may be added depending on the various types and numbers of communications systems being supported by the MCT processor. The communications switch 154 also includes the communications processor 176 which, in turn, includes a server identifier processor 244, network determination processor 242 and a translation processor 240. As further shown, the translation processor 240 and network determination processor 242 are included within the VLR 289. As one skilled in the art will readily appreciate, the VLR 289 includes more information than is shown in this figure. The processors of this figure may comprise personal computers, work stations, individual micro processors with associated memory, or any other type of device that processes digital information based on operational instructions.

The server identifier processor 244 includes a table which includes a protocol field 254, a server ID field 256, and a current load field 258. The protocol field 254 stores information related to the communication protocol conversion that the associated performs. The current load field 258 stores, for a particular server, the number of communications protocol conversions the server is current processing. Such information can then be used for load balancing, call blocking, and other system level processing. As one skilled in the art will readily appreciate, entering, updating, and removal of data from the server identifier processing table will be implemented in software executed by the respective processor.

The network determination processor 242 includes a table which has a subscriber ID field 250 and a homesite field 252. The subscriber ID field 250 stores the unique identification code of a particular communication device. The associated homesite field 252 stores the address of the HLR, or VLR, to which the communication device is registered. From the HLR, or VLR, information about the communication device can be obtained. For example, such information would include the communication protocol used by the communication device, the services to which the communication device has subscribed to, and other pertinent information.

The translation processor 240 includes a table having fields for subscriber ID 246 and protocol 248. The protocol field is updated based on the information retrieved from the HLR, or VLR. By storing this information locally, the speed in which the conversion can occur increases.

Figure 9:
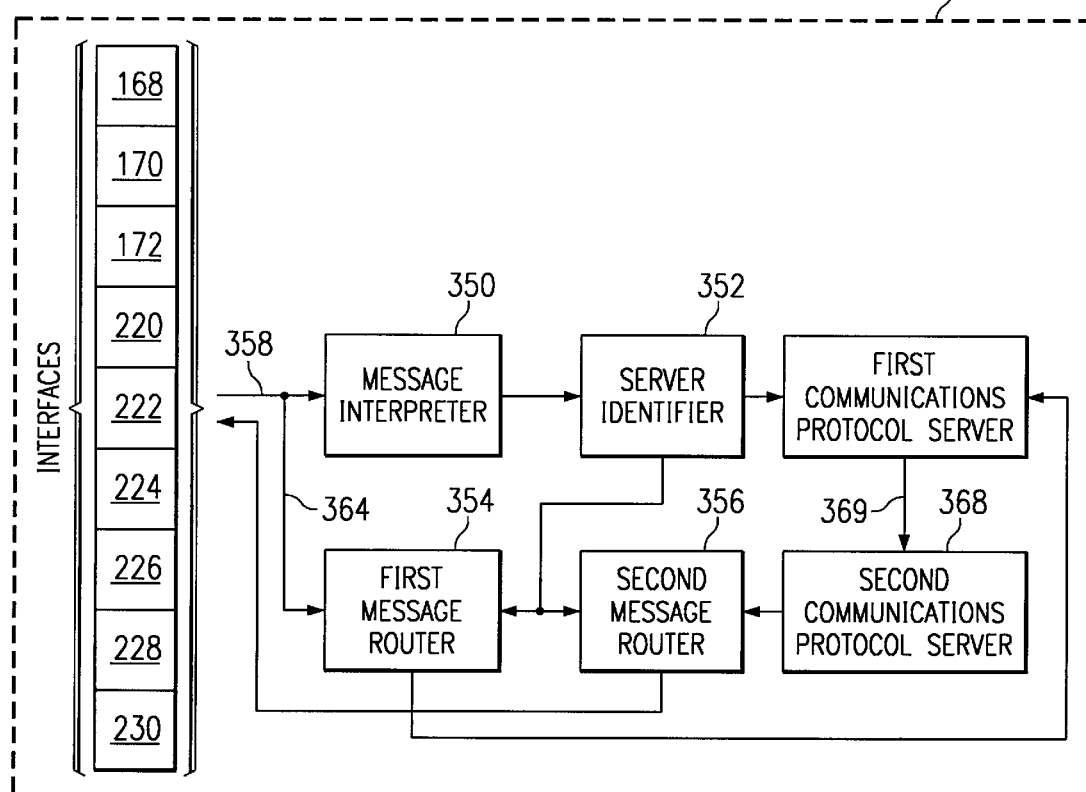
FIG. 9 illustrates an alternate embodiment for a communication switch of the type illustrated in FIG. 8.

FIG. 9 illustrated an alternative embodiment for the communications switch 154, which can be implemented by a personal computer, work station, or any device that processes digital information in response to operational instructions. As shown, the communications switch 154 includes a plurality of interfaces 168, 170, 172, 220, 222, 224, 226, 228, 230 which interface with various types of communications systems. The communications switch 154 has a message interpreter 350, a server identifier 352, a first message router 354, and a second message router 356.

The message interpreter 350 receives first communications information 358 via one of the plurality of interfaces 168, 170, 172, 220, 222, 224, 226, 228, 230. The message interpreter 350 interprets the communications information at 358 to identify a first communications protocol 360 and a first message 364, which is formatted using the first communications protocol. The extracted first communications protocol information 360 is routed to the server identifier 352, while the first message 364 is routed to the first message router 354. The server identifier 352 interprets the first communications protocol to identify a first communications protocol server 362. Note that for each particular communications protocol, there may be a plurality of servers. Thus the server identifier 352 would select one of the plurality of first communications protocol servers based on loading, services required, etc.

The first message router 354, upon receiving the first message 364, routes it to the first protocol server 366, as identified by the server identifier 352. As previously discussed, the first protocol server will convert the first message into a generic message at 369, which will subsequently be converted by a second protocol server into a second message having a second communications protocol format.

The second message router 356 receives a second message 368 from the second protocol server, wherein the second message is formatted based on a second communication protocol. The second message router 356 then routes the second message 368 to one of the plurality of interfaces based on the identify of a targeted communications device contained within the second message or information received from the message interpreter 350.

Figure 10:
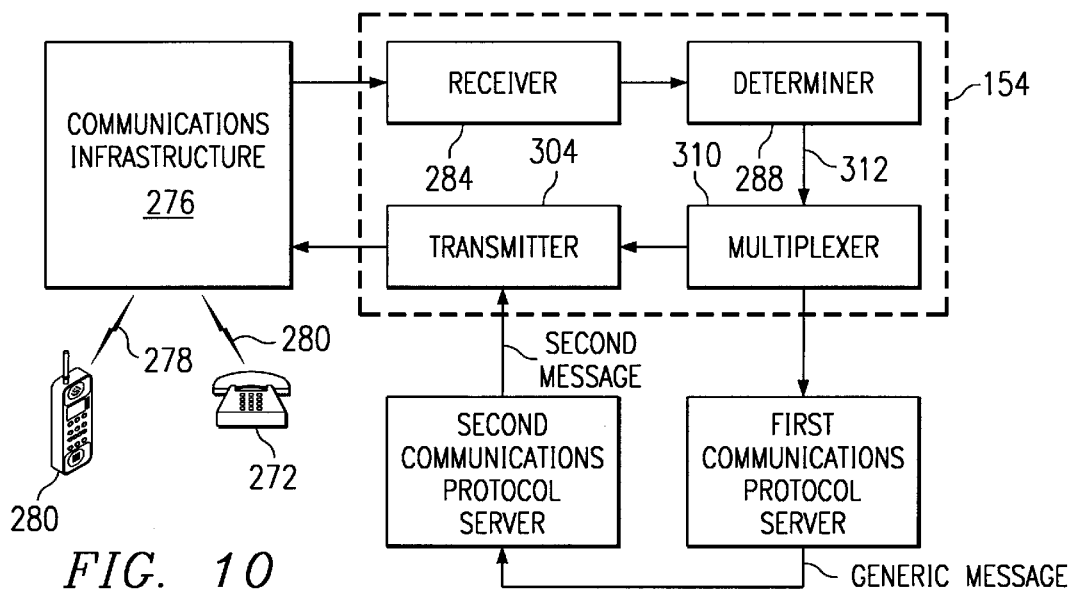
FIG. 10 illustrates another alternate embodiment of the communication switch in accordance with the present invention.

FIG. 10 illustrates another alternate embodiment of the communications switch 154, which can be implemented by a personal computer, work station, or any device that processes digital information in response to operational instructions. As shown, the communications switch 154 is coupled to communications infrastructure 276 which, in turn, is coupled to a first and second communications device 272, 280 via a wireline 280 or wireless link 278.

The communications switch 154 includes a receiver 284, a determiner 288, a control signal path 312, a multiplexer 310, and a transmitter 304. In operation, the receiver 284 receives communications information via the communications infrastructure 276 and transmits the received communications information to the determiner 288. Note that the communication information may be call set-up information, on-going voice or data communications, or any other type of information that can be conveyed by a telecommunication system.

The determiner 288, upon receiving the communication information, determines the identity of a first communications device and a second communications device. From the identity of these devices, the determiner 288 determines the type of communications protocols used by each the devices. If each device utilizes the same communications protocol, the determiner 288, via a control signal transmitted over path 312, enables the multiplexer 310 to provide the incoming communications information directly to the transmitter 304. In this mode, the transmitter 304 routes the communications information back to the communications infrastructure 276 which is subsequently provided to either the first or second communications device.

If, however, the determiner 288 determines that the first and second communications devices utilize different communications protocol, the determiner 288, via a control signal transmitted over path 312, controls the multiplexer 310 to process the message outside of the switch. As discussed above, the communications information, or message is routed to a first communications protocol server. The first communications protocol server converts the first message into a generic message having a generic communication protocol format. The generic message will subsequently be converted by a second communications protocol server into a second message having a second communication protocol format. The second message is sent by the second communications protocol server to the transmitter 304 and subsequently routed to the communications infrastructure 276.

Figure 11:
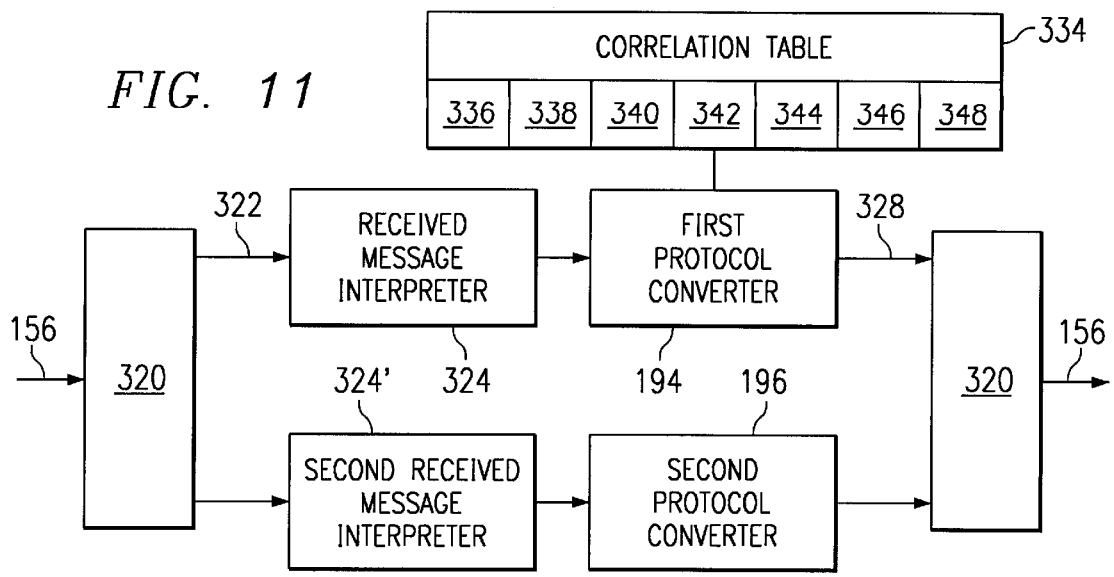
FIG. 11 illustrates an embodiment of a communication protocol server for handling multiple communication protocols in accordance with the present invention.

FIG. 11 is a block diagram of a communications protocol server 158, 160, 162, which can be implemented by a personal computer, work station, or any device that processes digital information in response to operational instructions. As shown, the communications protocol server includes a data transport medium interface 320, a received message interpreter 324, a first protocol converter 194 and a second protocol converter 196. In operation, the data transport media interface 320 will receive a message from the data transmission media 156 and subsequently provide the received message 322 to the received message interpreter 324 and the protocol converter 194.

The received message interpreter 324 determines the communication protocol of the received message 322. This can be done by reading header information from the received message 322 that identifies the communication protocol or by interpreting the identity of the transmitting communication device and performing a table look up. Having determined the communications protocol referred to as the first commutation protocol, the message interpreter 324 enables the protocol converter 194 to convert the received message 322 into a generic message 328.

The conversion of a message having a first communication protocol format into a message having a generic communication protocol may be done by using a correlation table 334. As shown, the correlation table 334 includes an information formatted in first protocol field 336 and a corresponding information formatted in a generic protocol field 338. Convertible messages (i.e., those that can be converted) include call setup information 340, call tear down information 342, voice information 344, data information 346, and multimedia information 348. As previously mentioned, the generic protocol may be one of the types of protocol served by the system, such as GSM, CDMA, TDMA, it may be a newly created protocol, or it may be an adoption of a particular standard such as IS-41.

Once the protocol converter 194 has converted the first message into a generic message 328, the generic message 328 is provided to the data transport media interface 320 and subsequently provided to the data transport medium 156. Once the generic message is provided on the data transport medium 156, it is routed to a different communications protocol server, for subsequent conversion back into a communications protocol specific message.

The second protocol server may receive generic messages via the data transport medium 156, where such messages are provided to the second protocol inverter 196 and the second received message interpreter 324'. The received message interpreter interprets the incoming message to identify that the received message is formatted in the generic communication protocol format and enables the protocol inverter 196 to convert the received message into a message having a second communication protocol format.

As one skilled in the art will readily appreciate, the communications switch and protocol servers of the multi communications type processor may be any type of processing device. For example, each may be a separate microprocessor, microcontroller, computer work station, a mainframe or any other type of device that processes digital information based on corresponding operational instructions.

Figure 12:
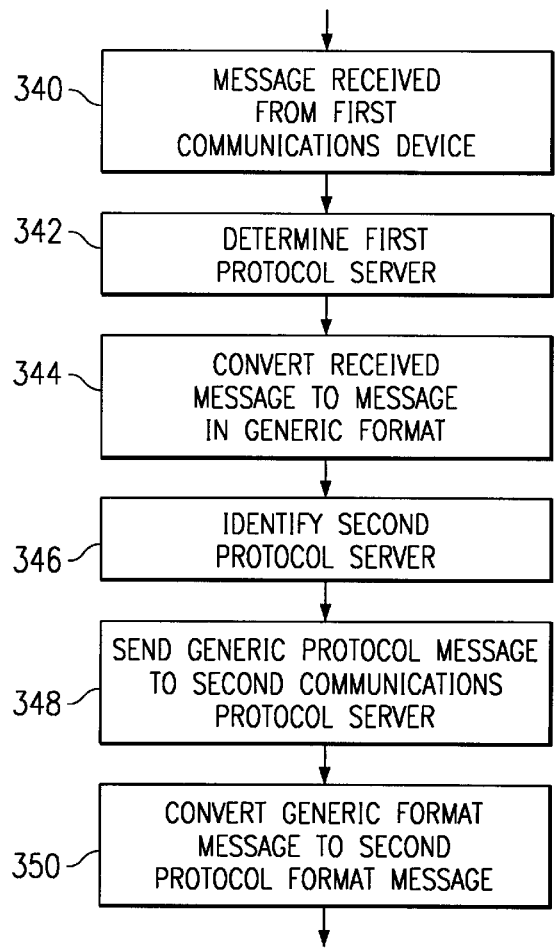
FIG. 12 is a flow diagram of the process that may be used to implement a protocol conversion in accordance with the present invention.

FIG. 12 is an operational flow chart for the operation of the present invention. The process begins at step 340 wherein a message is received from a first communications device. The message includes the identity of a first and second communications devices wherein the first communications device uses a first communications protocol and the second communications device uses a second communications protocol. As previously mentioned, the first and second communications protocols may be different over the air interfaces such as CDMA, TDMA, GSM etc., they may be wireline interfaces such as the internet or cable, or they may be the same type of over the air interfaces, but operating at a different encoding bit rate.

Upon receiving this message, the process proceeds to step 342 wherein the identity of a first communications protocol server is determined based on the first communications protocol. As previously mentioned, the HLR or VLR contain data identifying the protocol used by the first communications device. Having identified the first communications protocol server, the process proceeds to step 344 wherein the server prepares a generic message from the received message. Having prepared the generic message, the process proceeds to step 346 wherein a second communications protocol server is identified based on the second communications protocol. The second protocol server may be identified either via the first communications protocol server utilizing the home location register, it may be identified by the communications switch 154 utilizing a table look up, or it may be identified by the information transmitted from the switch to the first communications protocol server. These are but a few of the methods which could be used to identify the second communications protocol server and, as one skilled in the art will readily appreciate, there is a plurality of more methodologies to identify the second communications protocol server.

Having identified the second communication protocol server, the process proceeds to step 348 wherein the first communications protocol server transmits the generic protocol message to the second communications protocol server. Upon receiving this information, the second communications protocol server, at step 350, converts the generic protocol message into the second message having the second communications protocol format. With such a method, the present invention allows multiple types of communications protocols to be serviced without having to convert the information to PCM data and also avoids having to route all the information to the PSTN. Thus increasing efficiency of the PSTN and reduces the cost of operation for local telecommunication service providers.

Figure 13:
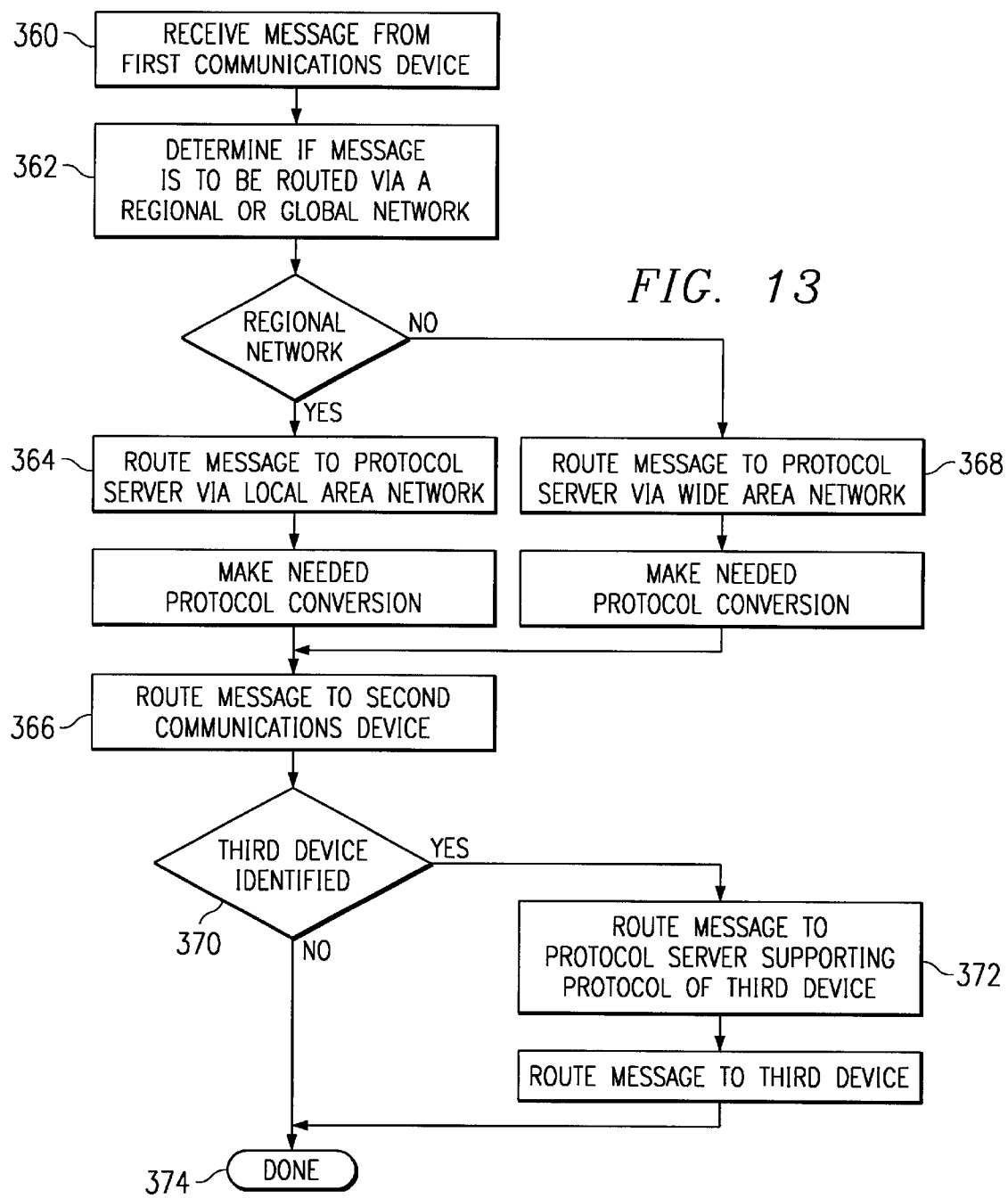
FIG. 13 is a flow diagram of the process that may be used to implement an alternate protocol conversion in accordance with the present invention.

FIG. 13 is an alternate flow diagram that may be used to implement the present invention. The process begins at step 360 wherein a message is received from a first communications device. The process then proceeds to step 362 wherein a determination is made as to whether the message will be routed via a regional network or a global network. If the message is to be routed via a regional network, the process proceeds to step 364 wherein the regional switch routes the message to a protocol server via a local area network. Having done this, the process proceeds to step 366 wherein, upon receiving a protocol converted representation of the message, the message is routed to a second communications device.

Alternatively, if the message is to be routed via a global network, the process proceeds to step 368. At step 368, the regional switch routes the message to a protocol server via a wide area network. Having done this, the process proceeds to step 366. For clarification, the global network, or wide area network is represented in FIG. 3 while the local area network or regional network is shown in FIG. 2.

Having done this, the process proceeds to step 370 wherein a determination is made as to whether the message includes identity of a third communications device. If so, the process proceeds to step 372 wherein the message is routed to a protocol server supporting the communications protocol used by the third communications device. If not, the process proceeds to step 374 wherein the process is done for this particular message.

Note that the present invention allows for conference calls wherein the members of the conference call each utilize a different communications protocol. For example, a conference call may be established between a communications device that utilizes CDMA, a communications device that utilizes TDMA, and a communications devices that utilizes GSM. By assigning a particular communications protocol server for each one of these communication devices, the incoming messages from the communications device are converted to generic messages which, in turn, are subsequently converted back to the communications protocol specific format for each of the corresponding members on the conference call.

Figure 14:
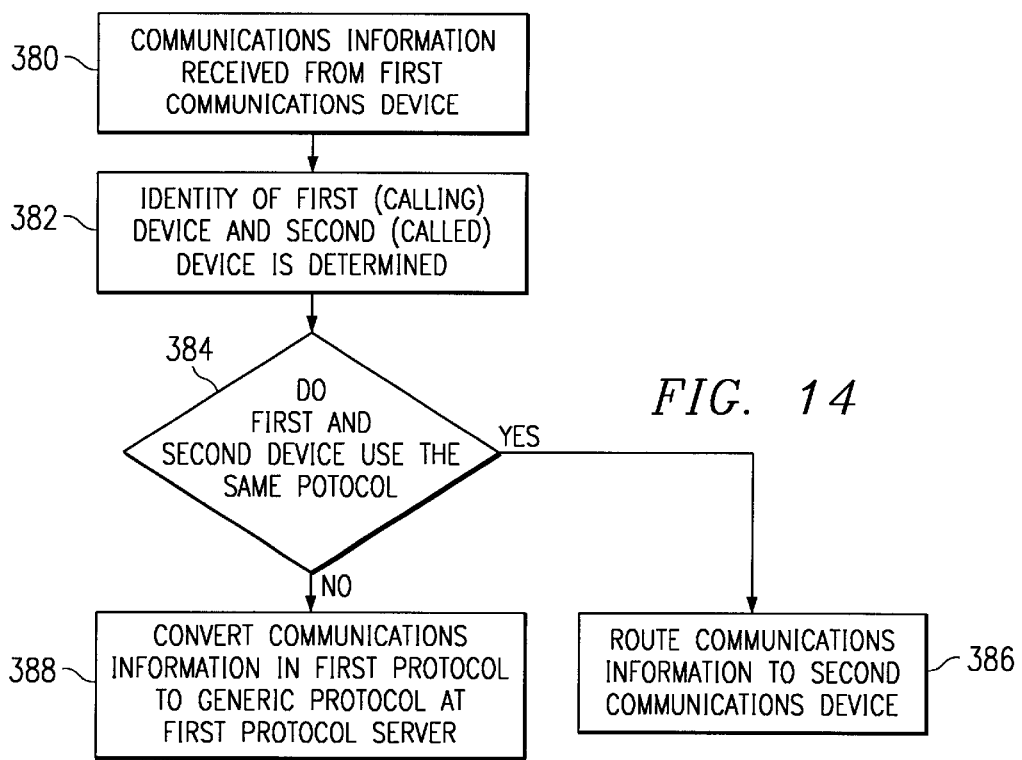
FIG. 14 is a flow diagram of the process that may be used to implement the switch portion of the protocol conversion, such logic diagram is in accordance with the present invention.

FIG. 14 is yet another alternate flow diagram that may be used to implement the present invention. The process begins at step 380 wherein communications information is received from a first communications device via communications infrastructure. The process then proceeds to step 382 wherein the identity of the first (calling or originating) and second (called or terminating) communications devices is determined. The process then proceeds to step 384 wherein a determination is made as to whether the first and second communications devices utilize similar communications protocols. If so, the process proceeds to step 386 wherein at least a portion of the communications information is routed to the second communications device without the conversion. Note that a portion of the communications information may be messaging, identification information, or any other particular type of information that can be conveyed from a first communications device to another communication device in a telecommunications system.

If, however, the first and second communications devices do not use similar communications protocols, the process proceeds to step 388. At step 388, the first communications protocol server converts at least a portion of the communications information into a generic protocol message. Having done this, the process proceeds to step 400 wherein the first communications protocol server transmits the generic message to a second protocol server. Next, the process proceeds to step 402 wherein the second protocol server converts the generic message into a second message having a second communications protocol format. Finally, at step 404, the second message is transmitted to the second communications device.

Figure 15:
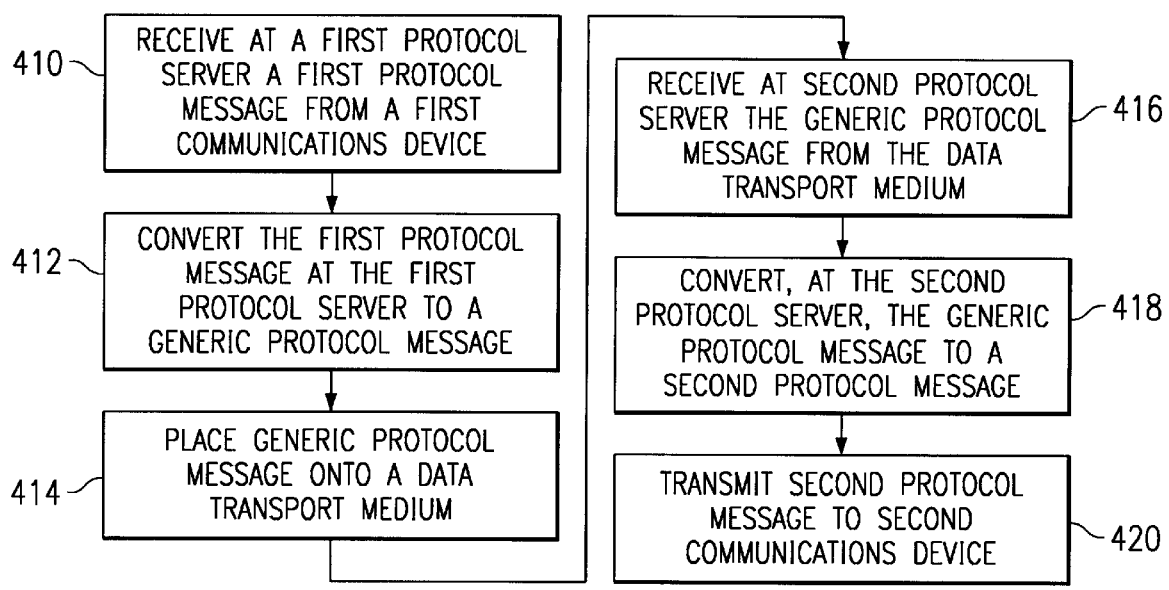
FIG. 15 is a flow diagram of the process that may be used to implement the protocol server of the protocol conversion in accordance with the present invention.

FIG. 15 illustrates yet another alternate embodiment that may be used to implement the present invention. The process begins at step 410 wherein a first communications protocol server receives a first protocol message from a first communications device. The process then proceeds to step 412 wherein the first communications protocol server converts the first protocol message into a generic message. At step 414, the first communications protocol server provides the generic message to a data transport medium. A second communications protocol server, at step 416 retrieves the generic message from the data transport medium and subsequently converts the generic message into a second protocol message. This is done at step 418. Finally at step 420, the second protocol converter transmits the second protocol message to a second communications device.

Figure 16:
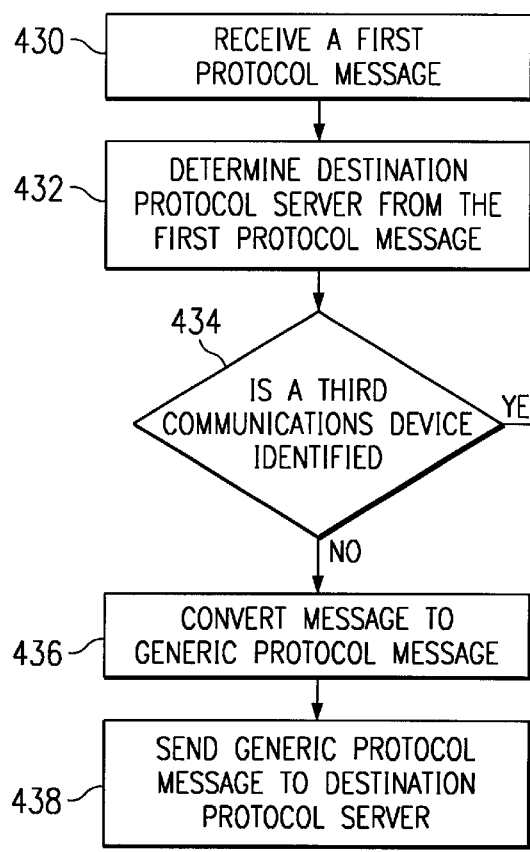
FIG. 16 is a flow diagram of the process that may be used to implement a multiple protocol conversion in accordance with the present invention.

FIG. 16 illustrates yet another alternate embodiment that may be used to implement the present invention. The process begins at step 430 wherein a message having a first protocol format is received. The process proceeds to step 432 wherein a destination protocol server is determined from the message. The process then proceeds to step 434 wherein a determination is made as to whether the message includes the identity of a third communications device. If not, the process proceeds to step 436 wherein the message is converted into a generic message having a generic protocol. Having done this, the process proceeds to step 438 wherein the generic message is provided to the destination protocol server.

If, however, the message includes the identity of a third communications device, the process proceeds to step 440. At step 440, a second destination server is determined. Having done this, the process proceeds to step 442 wherein the message is converted into a generic message by the second destination server. Once converted, the process proceeds to step 444 wherein the generic message is provided to the destination servers.

Figure 17:
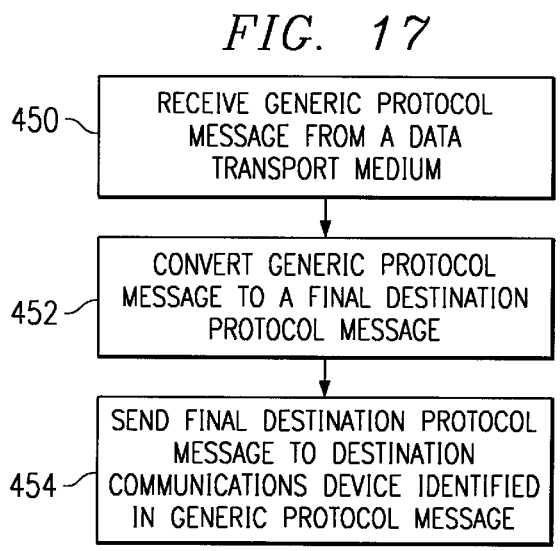
FIG. 17 is a flow diagram of the process that may be used by a protocol server in accordance with the present invention.

FIG. 17 is yet another alternate flow diagram that may be used to implement the present invention. The process begins at step 450 wherein a generic message is retrieved from a data transport medium. The process then proceeds to step 452 wherein the generic message is converted into a destination message having one of the plurality of communication protocol formats. Next, at step 454, the destination message is provided to a destination communications device as identified within the generic message.

The operation of the invention will be described with reference to FIG. 1. In this exemplary explanation, the first communication protocol may be CDMA while the second communication protocol may be GSM. Additionally, both communication systems are assigned to be within the same geographic area.

The communication switch 154 is coupled to CDMA equipment 182 which services the first communications device 54. Similarly, the switch 154 is coupled to the GSM equipment 184 which services the second communications device 52.

A call set up begins when a communication device, in this example hand set 54 transmits a call origination message to its affiliated base station which comprises part of the CDMA equipment 182 as is well understood in the art. The call origination message includes the identity of the device originating the message and an indication of the desired service. For this example, the desired service is a telephone call to hand set 52. As such, the call origination message includes the request for a call and the identity of hand set 52. Once base station for CDMA equipment 182 receives the call origination message, it routes the call origination message to the communication switch 154.

The communication switch 154 performs a protocol look up, which may be done by accessing an HLR, to identify the appropriate protocol server. In this example the appropriate protocol server is protocol server 160 which is identified by the processor 176. The origination message is then routed to protocol server 160. The protocol server 160 processes the origination message to generate a call set up message. Protocol server 160 routes the call set up message to the base station of the CDMA equipment 182 via the communication switch 154. In response, base station in the CDMA equipment 182 provides a call set up complete message to protocol server 160 via the communication switch 154.

Once the call set up complete message is received at the protocol server 160, it generates an initial address message (IAM) utilizing a generic protocol format. In this example, the generic protocol format is Signaling System #7 (SS7), which is a well known protocol for providing signaling between two communication switches. The SS7 formatted IAM message 526 is provided to protocol server 162, which converts, in the inverter 196, the SS7 formatted IAM message into an IAM message formatted in the second communication protocol (i.e., the one used by protocol server 162 and the associated communication system).

Having made the conversion, protocol server 162 sends a page message to hand set 52 via the communication switch 154 and the base station in the GSM equipment 184. Hand set 52 responds to the page with a response that is routed to protocol server 162 via the communication switch 154 and base station in the GSM equipment 184. Protocol server 162 converts in the converter 184 the response into a generic, SS7 formatted, address complete message (ACM) and routes the SS7 ACM message to protocol server 160. Protocol server 160 converts the ACM message into an ACM message having a first communication protocol format. At this point, call set up is complete and the system is awaiting hand set 52 to answer.

Once hand set 52 answers, an answer response is created and routed, via base station in the GSM equipment 184 and the communication switch 154, to protocol server 162. In response, protocol server 162 converts at 194 the answer to a generic, SS7 formatted, message and routes the generic message to protocol server 160. Protocol server 160 converts the generic message into a message having a first communication protocol format. The inverted answer message in the first communications protocol is routed to hand set 54 via the communication switch 154 and base station in the CDMA equipment 182. At this point, voice and/or data is communicated between the hand sets.

In this example, the hand sets are communicating voice information. Such a communication begins when hand set 54 generates a voice message. The voice message is routed to protocol server 160 via base station in the CDMA equipment 182 and the communication switch 154. Protocol server 160 converts at 190 the voice message in to a message having a generic format. Such conversion may be done by performing a direct mapping. The direct mapped voice-generic-message is provided to protocol server 162. Protocol server inverts at 196 the generic message into a message that has a second communication protocol format. Having done this, protocol server 162 provides the inverted message to hand set 52 via the communication switch 154 and base station in the GSM equipment 184.

Back and forth conversion and inversion of messages, whether voice or data, will continue in this manner until one of the parties terminates the call. When this occurs, a call tear down process is invoked. Such a call tear down process is very similar to the inverse of the call set up process. Thus, the necessary conversions and inversions should be inherent from the information provided.

As one skilled in the art will readily appreciate, the example just described assumes that communication channels were available in both systems. If channels were not available, additional processing would be required. Additionally, the above described process is applicable for inter-system and intra-system processing, such as hand off.

The present invention has been described as both a method and apparatus for processing multiple types of communications via a single system. With such a method and apparatus, the need to route communications supporting different types of communications protocols to the PSTN has been eliminated. The present invention allows local processing either through a local switch, or a distributed network, to facilitate communications between different types of communications systems. In addition, in satellite applications, the present invention allows a single satellite link to couple remote wireless units with differing communications protocol together. Therefore, the present invention improves the overall efficiency of telecommunications systems.

What is claimed is:

1. A method for processing multiple types of communications, the method comprising the steps of:
  a) receiving a message from a first communication device, wherein the message includes at least identity of the first communication device and identity of a second communication device, wherein the first communication device utilizes a first communication protocol and the second communication device utilizes a second communication protocol;
  b) identifying a first communication protocol server based on the first communication protocol;
  c) preparing, by the first communication protocol server, a generic protocol message from the message;
  d) identifying a second communication protocol server based on the second communication protocol;
  e) transmitting a generic protocol message directly from the first communication protocol server to the second communication protocol server; and
  f) converting, by the second communication protocol server, the generic protocol message in to a second formatted message based on the second communication protocol.

2. The method of claim 1, further comprises identifying the first communication protocol and the second communication protocol as supporting at least one of: a wireless communication, a wireline communication, a fixed wireless communication, or a satellite communication.

3. The method of claim 2 further comprises, when the first communication protocol or the second communication protocol is to support the wireless communication, identifying the first communication protocol or the second communication protocol to be at least one of: Code Division Multiple Access (CDMA), Time Division Multiple Access (TDMA), Frequency Division Multiple Access (FDMA), Personal Communication Services (PCS), Global Systems for Mobile (GSM), Advanced Mobile Phone System (AMPS), or Personal Access Communication Systems (PACS).

4. The method of claim 1, wherein step (a) further comprises determining the message to be at least one of: a voice communication, a facsimile communication, a data communication, or a multi-media communication.

5. The method of claim 1, wherein step (d) further comprises identifying, by the first communication protocol server, the second communication protocol server based on the identity of the second communication device.

6. The method of claim 5 further comprises identifying the second communication protocol server by performing a look-up within a Home Location Register to obtain a subscriber profile of the second communication device.

7. The method of claim 1, wherein step (d) further comprises identifying, by a communication switch, the second communication protocol server based on the second communication protocol.

8. The method of claim 1, wherein step (d) further comprises identifying, by a communication switch, the second communication protocol server based on the second communication device.

9. The method of claim 8 further comprises, prior to step (c), transmitting the message to the first communication protocol server, wherein the message includes identity of the second communication protocol server.

10. The method of claim 1 further comprises, prior to step (c), determining whether a communication between the first communication device and the second communication device is serviceable by a regional network or global network.

11. The method of claim 10 further comprises, when the communication is serviceable by the regional network,
routing, by a regional switch, the message to the first communication protocol server, wherein the first communication protocol server is coupled to the regional switch via a local area network; and
routing, by the regional switch, the second message to the second communication device.

12. The method of claim 10 further comprises, when the communication is serviceable by the global network,
routing, by a regional switch, the message to the first communication protocol server, wherein the first communication protocol server is coupled to the regional switch via a wide area network; and
routing the second message to the second communication device via the wide area network.

13. The method of claim 1, wherein step (b) further comprises determining the first communication protocol and the second communication protocol by performing a translation table look-up.

14. The method of claim 1, wherein step (c) further comprises preparing the generic protocol message to have a format based on data messaging.

15. The method of claim 1, wherein step (c) further comprises receiving the message from a switch, wherein the message is formatted based on the first communication protocol.

16. The method of claim 1, wherein step (b) further comprises determining identity of a third communication device from the message.

17. The method of claim 16 further comprises:
identifying a third communication protocol server from the identity of the third communication device;
sending the generic protocol message to the third communication protocol server; and
converting, by the third communication protocol server, the generic protocol message in to a third message formatted based on a third communication protocol.

18. A method for processing multiple types of communications, the method comprising the steps of:
a) receiving communication information, via communication infrastructure, from a first communication device;
b) determining from the communication information at least a first party identity that identifies the first communication device and a second party identity that identifies a second communication device;
c) determining whether the first communication device and the second communication device utilize a similar communication protocol;
d) when the first and second communication devices utilize a different communication protocol, converting, by a first communication protocol server, at least a portion of the communication information in to a generic protocol message;
e) transmitting, by the first communication protocol server, the generic protocol message to a second communication protocol server; and
f) converting, by the second communication protocol server, the generic protocol message in to a second message having a format based on a second communication protocol of the second communication device.

19. The method of claim 18 further comprises, when the first communication device and the second communication device utilize the similar communication protocol, routing the at least a portion of the communication information to a second communication device identified by the second party identity.

20. An apparatus for processing multiple types of communication, the apparatus comprising:
a communications switch that includes:
a plurality of wireless communication interfaces, wherein at least a first one of the wireless communication interfaces provides an interface for first wireless protocol communications and at least a second one of the wireless communication interfaces provides an interface for second wireless protocol communications; and
a communications processor operably coupled to the plurality of wireless communication interfaces;
a plurality of communication protocol servers operably coupled to the communication processor, wherein at least a first one of the plurality of communication protocol servers functions as a server for the first wireless protocol communications and wherein at least a second one of the plurality of communication protocol servers functions as a server for the second wireless protocol communications, each of the plurality of the communication protocol servers includes:
a protocol converter that converts a received message having one of a plurality of communication protocols in to a first message having a generic protocol format; and
a protocol inverter that converts a received second message having the generic protocol format in to a message having the one of the plurality of communication protocols.

21. The apparatus of claim 20, wherein the communications switch further comprises at least one wireline interface that provides an interface for one of: telephone service, internet service, fixed wireless access, or cable service.

22. The apparatus of claim 20, wherein the communications switch further comprises at least one satellite interface that provides an interface for satellite service.

23. The apparatus of claim 20, wherein the first and second wireless protocol communications are different wireless protocols from a set of: Code Division Multiple Access (CDMA), Time Division Multiple Access (TDMA), Frequency Division Multiple Access (FDMA), Personal Communication Services (PCS), Global Systems for Mobile (GSM), Advanced Mobile Phone System (AMPS), or Personal Access Communication Systems (PACS).

24. The apparatus of claim 20 further comprises a Home Location Register operably coupled to the plurality of communication protocol servers, wherein the Home Location Register contains a plurality of subscriber profiles.

25. An apparatus for processing multiple types of communication, the apparatus comprising:

receiving means for receiving communication information, via communication infrastructure, from a first communication device, wherein the communication information includes at least one of: a first message, identity of a first communication device, or identity of a second communication device;

protocol determining means for determining whether the first communication device and the second communication device utilize a similar communication protocol;

converting means for converting the first message having a format based on a first communication protocol utilized by the first communication device in to a generic protocol message, when the first communication device and the second communication device utilize different communication protocols;

inverting means for inverting the generic protocol message in to a second message having a format based on a second communication protocol utilized by the second communication device when the first communication device and the second communication device utilize different communication protocols; and transmitting means for transmitting the second message to the second communication device via the communication infrastructure.

26. The apparatus of claim 25 further comprises a home location register operably coupled to the protocol determining means.

27. The apparatus of claim 25 further comprises:

second converting means for converting a third message having a format based on the second communication protocol utilized by the second communication device in to a second generic protocol message;

second inverting means for inverting the second generic protocol message in to a fourth message having a format based on the first communication protocol utilized by the first communication device.

28. The apparatus of claim 27 further comprises a multiplexer operably coupled between the receiving means and the transmitting means, wherein the protocol determining means provides a control signal to the multiplexer allowing the multiplexer to pass a message from the receiving means to the transmitting means when the first and second communication devices utilize the same communication protocol.

* * * * *